Figure 1:
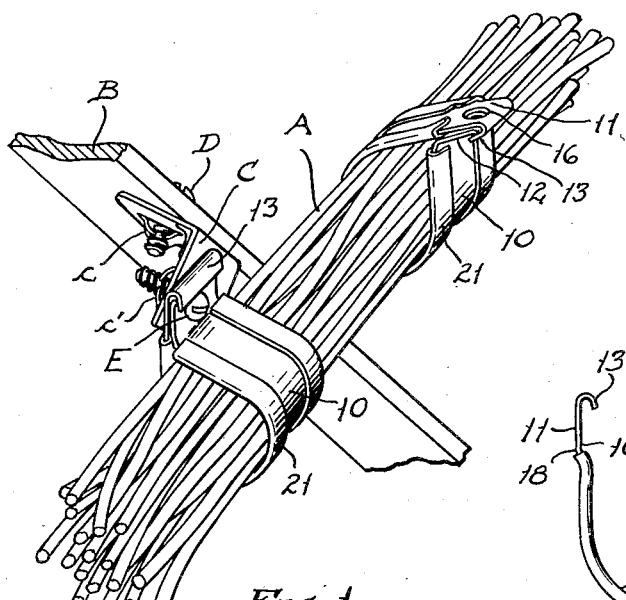

Jan. 11, 1944. C. E. METHENY 2,339,093
SNAP CLAMP
Filed Oct. 15, 1942

INVENTOR
Clyde E. Metheny,
BY Bates, Teare & McBean
ATTORNEYS

Patented Jan. 11, 1944

2,339,093

UNITED STATES PATENT OFFICE 2,339,093

SNAP CLAMP

Clyde E. Metheny, San Diego, Calif.

Application October 15, 1942, Serial No. 462,100

1 Claim. (Cl. 248—74)

This invention relates to a clamp adapted to surround a longitudinally extending body, as for instance an assembly of wires, and provide means for its attachment to a support. One of the objects of the invention is to provide such a clamp in a form which may be placed about the object and connected to the support in a minimum of time, and when attached will effectively hold the object in place.

My invention provides a clamp which may be closed upon a group of wires independently of the support and operates to hold the wires in compacted form, preliminary to the attachment, thus enabling the wires to be effectively assembled into a longitudinal bundle ready for attachment of the clamps to their respective supports.

Preferably, the clamp is protected on the interior by suitable smooth insulating material, and is thus well adapted for use in mounting the various electric wires in airplane work. The clamp does not abrade the insulation on the wires, and when the wires are laid out in a group parallel to each other it is a very simple matter to pass the clamp, which is an open loop, about the bundle and snap the ends of the clamp into interlocking engagement and thereafter attach the clamps.

My self-locking clamp is closed merely by having its end portions snapped together and then may be readily mounted by the simple expedient of a screw and a suitable spring nut, which method of attachment also reduces the time required in mounting the bundle of wires.

The invention is illustrated in the drawing hereof and hereinafter described in detail and the essential novel features set out in the claim.

Figure 2:
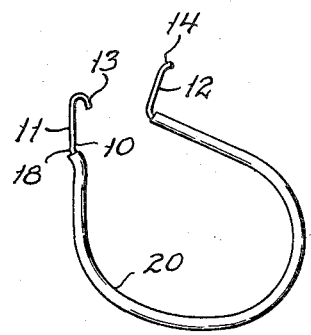
Figure 3:
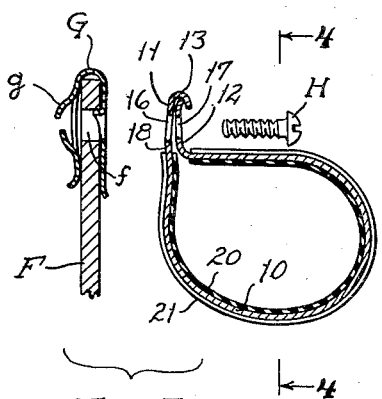
Figure 4:
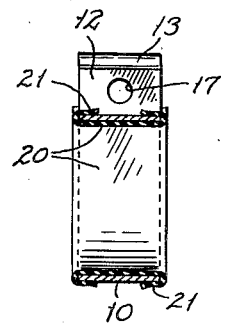

In the drawing, Fig. 1 is a perspective showing two of my clamps about a bundle of wires, one of the clamps being attached to a support and the other automatically holding itself in position about the wires preliminary to attachment to some support, not shown; Fig. 2 is a side elevation of the clamp in its open or normal position ready for positioning on the object; Fig. 3 is a view illustrating in section the clamp in closed position ready for attachment to a support, and illustrating a spring nut on the support and screw in proper relative position for mounting the clamp; Fig. 4 is a cross-section of the clamp, as indicated by the line 4—4 on Fig. 3.

As shown in each of the figures, this clamp comprises a strap 10 of spring sheet metal, preferably straight in its cross-dimension and looped into a U-shape with the ends adjacent each other but separated, when the clamp is in the state of equilibrium.

Forming the termination of one of these ends, is an arm designated 11, which is substantially a straight continuation of the adjacent portion of the loop, while the other end portion forms an arm 12 which is bent outwardly substantially at right angles to the adjacent portion of the loop. The arm 11 is bent over at its free end to make a spaced return edge 13 facing the arm 12, while the extreme end of the arm 12 is bent back slightly, as shown at 14.

When the clamp is closed, the inclined end 14 of the arm 12 engages the edge of the return bend 13 on the arm 11 and snaps beyond it and the resilience of the metal then causes this end 14 to slide up behind the hooked end 13, thus automatically retaining the clamp closed, as shown in Fig. 3.

As stated, the condition of equilibrium of the clamp is as shown in Fig. 2. To place this about the bundle of wires it is simply slipped laterally over the bundle in the desired location, the arm 12 being cammed back by a bundle if materially larger than the open distance between the two arms until the space within the loop is nearly filled by the bundle of wires. Then a manual pressure on the clamp adjacent the angle where the arm 12 joins the body will snap the free end of that arm into place beyond the hooked end 13 and the outward spring of the loop will cause the free end of the arm 12 to be automatically seated, so that the clamp comes into the locked position shown in Fig. 3.

The two arms 11 and 12 are provided with openings which register when the clamp is closed and provide for the passage of a fastening screw. Thus there is an opening 16 in mid-region of the arm 11 and an opening 17 in the mid-region of the arm 12. When the clamp is snapped about the wires these openings register with each other as shown in Fig. 3 and are ready for the reception of the attaching screw. When the screw is in place it substantially fills the openings, thus not only holds the clamp on the support but prevents any lateral shifting of one arm of the clamp on the other.

For purposes of insulation and to render the clamp perfectly smooth on its interior, I prefer to provide a lining of insulation 20 which extends across the interior of the loop portion of the clamp from the arm 11 to the arm 12. The marginal portions of this liner are bent outwardly and then back on themselves onto the outside of the metal band, as shown at 21, for a sufficient distance to hold the liner in place.

The lining 20 while of enough body to retain itself in place is preferably sufficiently yielding so that it provides a desirable cushion of insulating material preventing injury to the insulating covers of the wires. Moreover, the smooth interior and the rounded edges provided by this lining enable the clamp even when closed to be shifted somewhat along the bundle of wires without chafing the insulation of the wires, if re-positioning is necessary to enable the clamp to register with an opening in a support.

The arm 11, while nearly a straight continuation of the body of the metal loop, is preferably offset outwardly slightly as indicated at 19 (Fig. 3), so that the outer face of the arm substantially aligns with the adjacent outer faces of the bent over margins 21 of the liner.

It will be seen that such a clamp as described may be mounted with the maximum of speed about a bundle of wires, the loop being shoved laterally over the bundle, or pulled apart at its ends, if necessary, and then is manually snapped into the closed position in Fig. 3, whereupon the clamp is ready for attachment.

Fig. 1 indicates a bundle of wires A embraced by two of my clamps, one of these clamps is shown as merely snapped into closed position about the bundle, serving to hold these wires together. The other clamp is shown as snapped and attached to a support.

To reduce the time of attaching to a minimum, I prefer to use a spring nut which automatically locks the attaching screw. In Fig. 1, I have shown a support B carrying an angle clip C, each arm of which has an opening for a screw and a pair of spring tongues to coact with the screw. Such a screw indicated at D passes through the support and is engaged by the two spring tongues c. To attach the clamp it is only necessary to pass a screw, indicated at E, through two openings 17 and 16 in the arms 12 and 11 into engagement with the spring tongues c' in the projecting arm of the angle clip C.

In Fig. 3, I have illustrated the clamp closed in position for mounting on a support of different form from the support B. That is to say, in Fig. 3 the support F is an upstanding stiff piece of metal embraced at the top by a U-shaped fastener G, the inner arm of which has an opening registering with an opening f in the support and a flange entering such opening, and the outer arm of which has a registering opening with spring tongues g at opposite sides thereof.

H in Fig. 3 indicates a screw in position to attach the device. When this screw is passed through the openings 17 and 16 and the registering opening in the adjacent leg of the fastener, and through the opening f in the support, the screw meets its nut provided by the spring tongues g, whereupon it is only necessary to turn in the screw H to mount the clamp with the enclosed bundle of wires.

My clamps may be very cheaply and rapidly constructed of a ribbon of flat sheet metal having spring characteristics, it being merely necessary to punch the openings in the strip, cut off the proper length and bend it into the open loop form with the outwardly projecting arms shown. After the formation of the metal loop, the protective lining is mounted thereon.

I claim:

A clamp adapted to be assembled about a bundle of wires prior to attachment thereof to a support, comprising a loop of spring metal having at the ends thereof substantially parallel portions, one of said parallel portions having a turned-over part in the shape of a hook, and the other of said parallel portions having a lip thereon for coacting with the hook, whereby direct pressure applied to said second-named end in a direction for fitting the loop to a bundle of wires causes the lip to snap into engagement with the hook, and said ends having registering openings therein for receiving fastening means.

CLYDE E. METHENY.